United States Patent
Ishibashi et al.

(10) Patent No.: US 10,471,912 B2
(45) Date of Patent: Nov. 12, 2019

(54) IN-VEHICLE EQUIPMENT CONTROL SYSTEM

(71) Applicant: Yazaki Corporation, Tokyo (JP)

(72) Inventors: Shuichi Ishibashi, Shizuoka (JP); Jun Goto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 120 days.

(21) Appl. No.: 15/669,040

(22) Filed: Aug. 4, 2017

(65) Prior Publication Data

US 2018/0043849 A1 Feb. 15, 2018

(30) Foreign Application Priority Data

Aug. 12, 2016 (JP) ................... 2016-158835

(51) Int. Cl.
*B60R 16/03* (2006.01)
*B60R 16/02* (2006.01)
*B60R 16/023* (2006.01)

(52) U.S. Cl.
CPC ........ *B60R 16/0315* (2013.01); *B60R 16/023* (2013.01); *B60R 16/0207* (2013.01); *B60R 16/03* (2013.01)

(58) Field of Classification Search
CPC ....... B60R 16/03; B60R 16/023; B60R 16/02; B60R 16/0315; B60R 16/0207; H02G 3/02; H02G 3/00; H02G 3/06; B60L 1/00; H02J 4/00; H01R 43/00; H01R 43/02
USPC ...................... 307/9.1, 10.1, 10.2, 10.6, 10.7
See application file for complete search history.

(56) References Cited

U.S. PATENT DOCUMENTS

| 5,825,096 A * | 10/1998 | Morimoto ............... B60R 11/02 307/9.1 |
| 6,009,105 A | 12/1999 | Hosokawa et al. |
| 6,504,262 B1 | 1/2003 | Aoki et al. |
| 2001/0005083 A1* | 6/2001 | Serizawa ............ B60R 16/0207 296/37.8 |
| 2002/0171291 A1* | 11/2002 | Wayne ................... B60Q 1/143 307/9.1 |

(Continued)

FOREIGN PATENT DOCUMENTS

| JP | 5-146081 A | 6/1993 |
| JP | 9-11822 A | 1/1997 |

(Continued)

OTHER PUBLICATIONS

Japanese Office Action for the related Japanese Patent Application No. 2016-158835 dated Jul. 17, 2018.

(Continued)

*Primary Examiner* — Rexford N Barnie
*Assistant Examiner* — Jagdeep S Dhillon
(74) *Attorney, Agent, or Firm* — Kenealy Vaidya LLP

(57) ABSTRACT

An in-vehicle equipment control system includes a wire harness configured to be connected with a power source mounted on a lower side of a vehicle than a ceiling of the vehicle, and provided in an extending manner from the lower side to the ceiling along a pillar of a vehicle body; and a ceiling side controller configured to control an equipment provided at least to the ceiling, the ceiling side controller being provided to the ceiling, electric power of the power source being supplied to the ceiling side controller via the wire harness passing through the pillar.

10 Claims, 3 Drawing Sheets

(56) References Cited

U.S. PATENT DOCUMENTS

| | | | | |
|---|---|---|---|---|
| 2005/0140209 A1* | 6/2005 | Fehr | ........................... | H02J 1/14 |
| | | | | 307/9.1 |
| 2010/0301668 A1* | 12/2010 | Yakes | ..................... | B60L 58/34 |
| | | | | 307/9.1 |
| 2011/0031809 A1* | 2/2011 | Yoshida | .............. | B60R 16/0215 |
| | | | | 307/42 |
| 2011/0043032 A1* | 2/2011 | Suzuki | ................ | B60R 16/0207 |
| | | | | 307/9.1 |
| 2016/0347268 A1* | 12/2016 | Shiratori | ................. | B60R 16/03 |

FOREIGN PATENT DOCUMENTS

| | | |
|---|---|---|
| JP | H09-011822 A | 1/1997 |
| JP | 9-169248 A | 6/1997 |
| JP | H09-169248 A | 6/1997 |
| JP | 2001-122055 A | 5/2001 |
| JP | 2007-320467 A | 12/2007 |
| JP | 2008-74167 A | 4/2008 |
| WO | 2015/163312 A1 | 10/2015 |

OTHER PUBLICATIONS

Japanese Office Action for the related Japanese Patent Application No. 2016-158835 dated Oct. 2, 2018.
Japanese Report of Reconsideration by Examiner before Appeal for the related Japanese Patent Application No. 2016-158835 dated Jan. 22, 2019.

\* cited by examiner

IN-VEHICLE EQUIPMENT CONTROL SYSTEM

CROSS-REFERENCE TO RELATED APPLICATION(S)

The present application claims priority to and incorporates by reference the entire contents of Japanese Patent Application No. 2016-158835 filed in Japan on Aug. 12, 2016.

BACKGROUND OF THE INVENTION

1. Field of the Invention

The present invention relates to an in-vehicle equipment control system.

2. Description of the Related Art

Conventionally, there has been known an in-vehicle equipment control system that controls various equipments mounted to a vehicle (see Japanese Patent Application Laid-open No. 2001-122055). In the in-vehicle equipment control system, for example, a controller thereof supplies electric power, transmits information signals (control signals, detection signals, or the like) to a equipment the operation of which is to be controlled, and controls the equipment based on the electric power and the information signals.

In a vehicle, equipments (illumination lamp, communication equipment, or the like) the operation of which is to be controlled (operation control associated with supply power control, operation control depending on a command value of a controlled variable, or the like) are provided also to the ceiling of the vehicle, and the number of such equipments has also increased in recent years. Accordingly, the number of communication lines for information signals increases depending on the types and quantity of the equipments provided to the ceiling. In general, in this kind of in-vehicle equipment control system, a wire harness is provided in an extending manner from the vehicle lower side, which is lower than the ceiling, to the ceiling along the pillar of the vehicle, and electric wires, such as a power source line and a communication line, are made to pass through the space in the inside of the pillar. Consequently, in consideration of the volume of the space in the inside of the pillar, it is desirable to prevent an increase in the number of electric wires passing through the space.

SUMMARY OF THE INVENTION

It is an object of the present invention to provide an in-vehicle equipment control system capable of preventing an increase in the number of electric wires in the inside of a pillar.

An in-vehicle equipment control system according to one aspect of the present invention includes a wire harness configured to be connected with a power source mounted on a lower side of a vehicle than a ceiling of the vehicle, and provided in an extending manner from the lower side to the ceiling along a pillar of a vehicle body; and a ceiling side controller configured to control an equipment provided at least to the ceiling, the ceiling side controller being provided to the ceiling, electric power of the power source being supplied to the ceiling side controller via the wire harness passing through the pillar, wherein the wire harness includes at least one common transmission channel capable of transmitting a plurality of information signals used when the ceiling side controller controls the equipment, between the lower side and the ceiling of the vehicle along the pillar, and the ceiling side controller controls the equipment to be controlled by using the electric power supplied and the information signals retained in a lower side controller arranged on the lower side of the vehicle, the information signals being received from the common transmission channel.

An in-vehicle equipment control system according to another aspect of the present invention includes a wire harness configured to be connected with a power source mounted on a lower side of a vehicle than a ceiling of the vehicle, and provided in an extending manner from the lower side to the ceiling along a pillar of a vehicle body; a ceiling side controller configured to control an equipment provided at least to the ceiling, the ceiling side controller being provided to the ceiling, electric power of the power source being supplied to the ceiling side controller via the wire harness passing through the pillar; and a lower side controller arranged on the lower side of the vehicle, wherein the wire harness includes at least one common transmission channel capable of transmitting a plurality of information signals used when the ceiling side controller controls the equipment, between the lower side and the ceiling of the vehicle along the pillar, the lower side controller transmits the information signals to the common transmission channel, and the ceiling side controller controls the equipment to be controlled by using the electric power supplied and the information signals received from the common transmission channel.

According to still another aspect of the present invention, in the in-vehicle equipment control system, it is preferable that the wire harness includes a power source line configured to supply electric power output from the power source, and a multiplex communication line as the common transmission channel, and the power source line and the multiplex communication line are provided in an extending manner from the lower side to the ceiling of the vehicle along the pillar, and connected with the ceiling side controller.

According to still another aspect of the present invention, in the in-vehicle equipment control system, it is preferable that a power source line is used as the common transmission channel, the power source line being connected with the ceiling side controller, the lower side controller, and the power source, the power source line being configured to supply electric power output from the power source to the ceiling side controller and the lower side controller, the lower side controller superimposes the information signals on the power source line, and the ceiling side controller extracts electric power and the information signals from a reception signal received via the power source line, and controls the equipment to be controlled.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of an in-vehicle equipment control system according to the present invention is explained in detail based on the drawings. The present invention is not limited to this embodiment.

Embodiment

Figure 1:
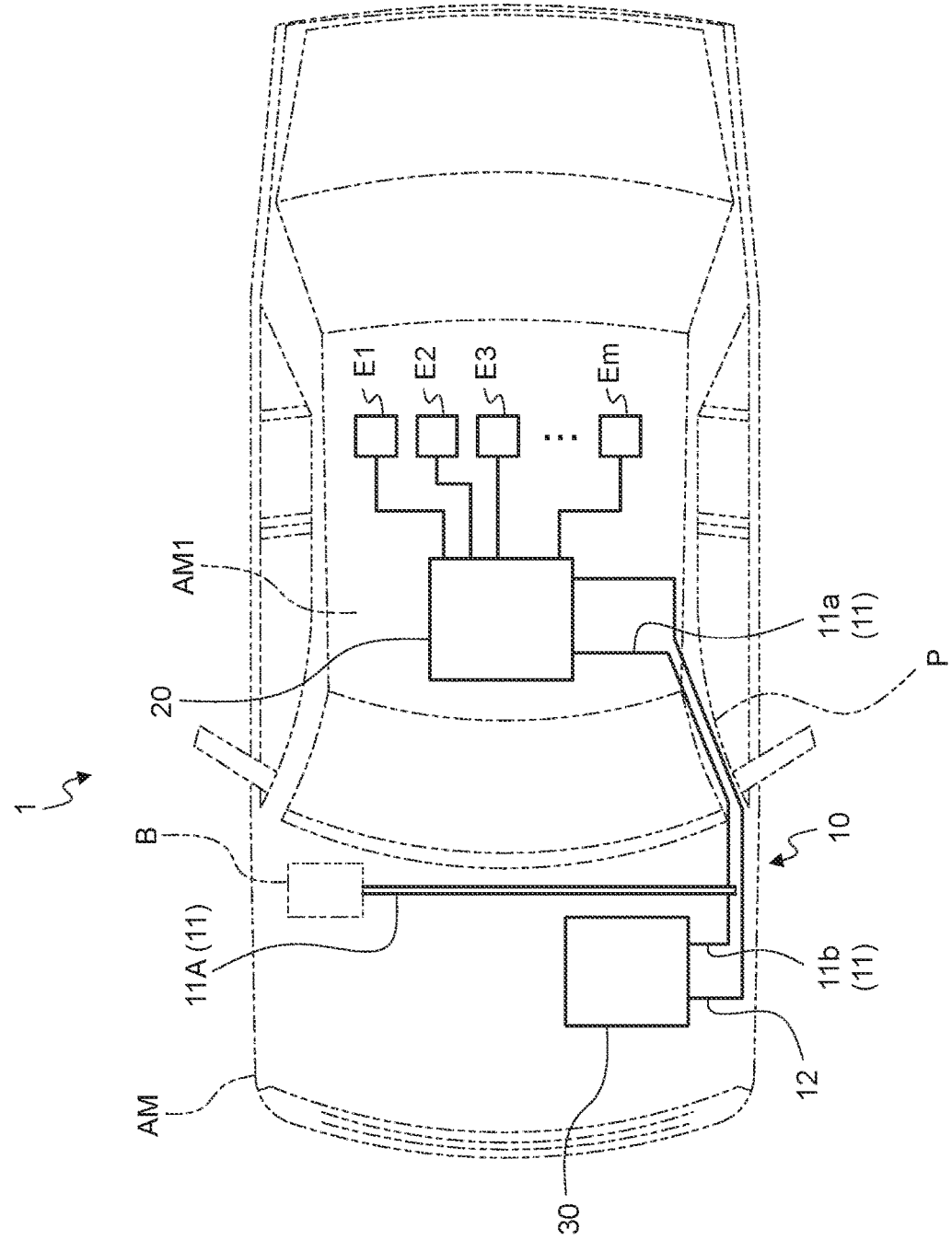
FIG. 1 is a view illustrating an in-vehicle equipment control system according to an embodiment as viewed from the upper side of a vehicle.
Figure 2:
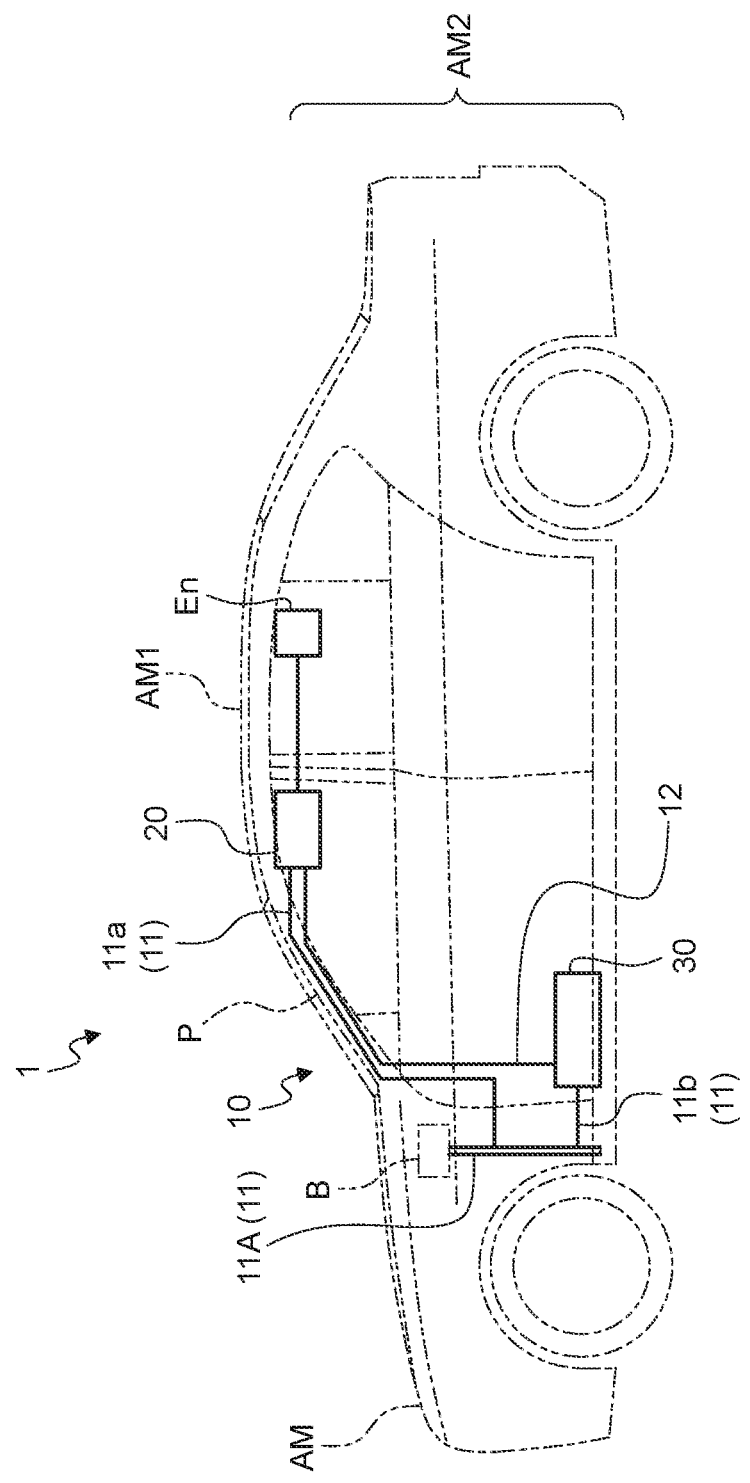
FIG. 2 is a view illustrating the in-vehicle equipment control system according to the embodiment as viewed from the side-face side of the vehicle.
Figure 3:
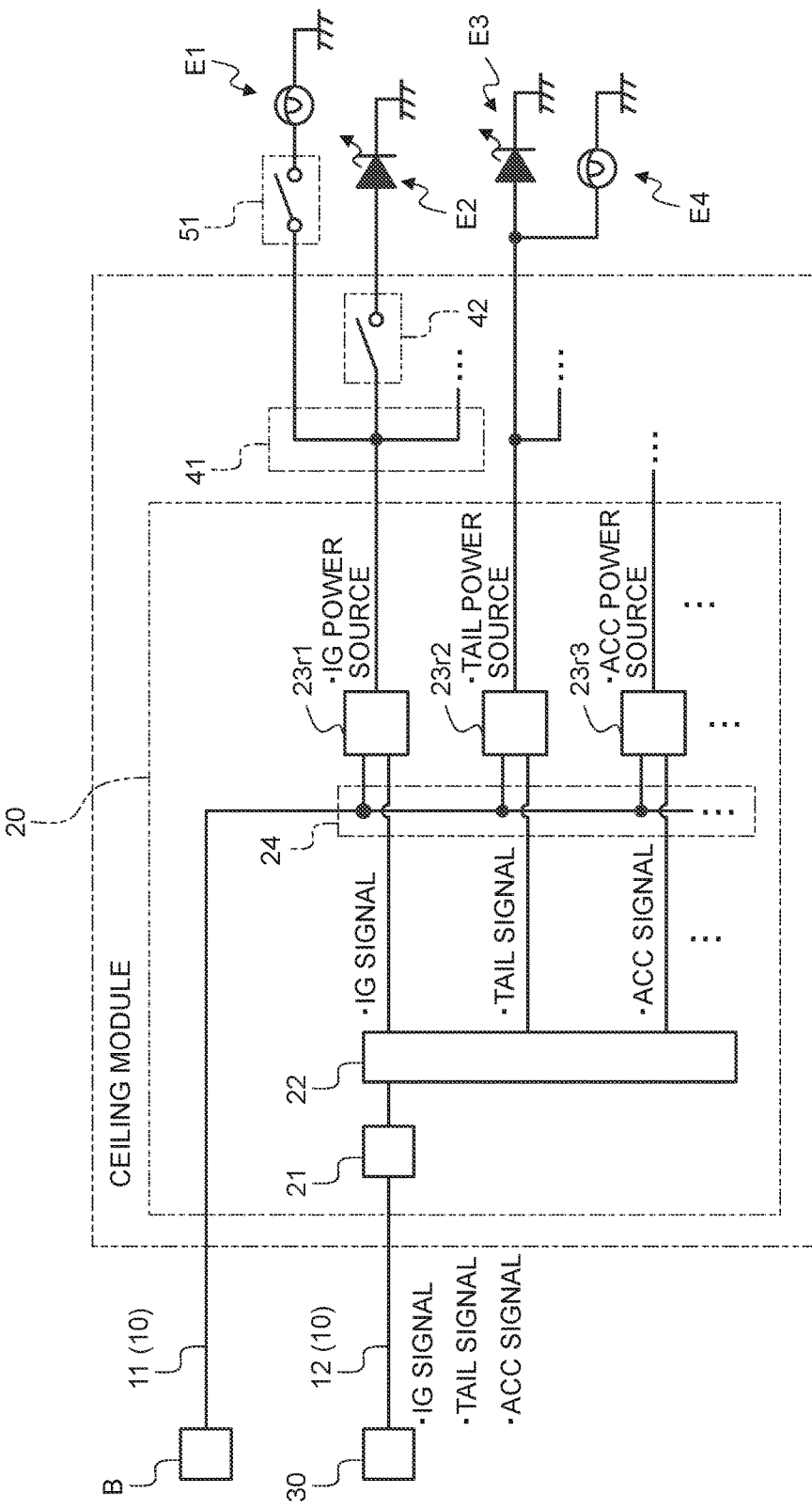
FIG. 3 is a view illustrating one of illustrative examples of the in-vehicle equipment control system according to the embodiment.

One embodiment of an in-vehicle equipment control system according to the present invention is explained based on FIG. 1 to FIG. 3.

FIG. 1 and FIG. 2 illustrate an in-vehicle equipment control system 1 according to the present embodiment. The in-vehicle equipment control system 1 includes a plurality of equipments En (n=1, 2, 3, . . . , m) to be controlled that are provided at least to a ceiling AM1 of a vehicle AM, the in-vehicle equipment control system 1 being provided to the vehicle AM. The exemplified in-vehicle equipment control system 1 targets at least two equipments En to be controlled that are provided to the ceiling AM1. Any desired equipment En may be targeted as long as the equipment En is mounted to the ceiling AM1 and operation control (operation control associated with supply power control, operation control depending on a command value of a controlled variable, or the like) of which is performed. For example, the equipment En to be controlled that is provided to the ceiling AM1 may include an illumination equipment, an indicator, a communication equipment, or the like. These various equipments En may be modularized by being provided to an overhead console, and may be individually provided to the ceiling AM1. Furthermore, the in-vehicle equipment control system 1 may also include an equipment En to be controlled that is arranged on the vehicle lower side AM2, which is lower than the ceiling AM1. The equipment En to be controlled that is arranged on a vehicle lower side AM2 may include an air conditioner, for example. Hereinafter, the vehicle lower side AM2 indicates a part lower than the ceiling AM1 in the vehicle AM, such as a floor panel, an instrument panel, and an engine compartment.

The in-vehicle equipment control system 1 includes a wire harness 10 provided to the vehicle AM. The wire harness 10 has at least one linear member, and at least one assembling member attached to the linear member. The linear member is a member that is formed in a linear shape, and is used for power supply or signal transmission. For example, the linear member may be formed as an electric wire (a power source line or a signal line) having a linear conductor, and may also be formed as a communication line having a form different from the electric wire, such as a linear optical fiber cable. Furthermore, the assembling member is a connector that transfers electric power and signals, which are transmitted through the linear member, to the other corresponding equipment (the equipment En described herein, a ceiling side controller 20 and a lower side controller 30 that are describes below, or the like), a protect member (corrugate tube or the like) that includes the linear member therein to protect the linear member, or the like.

In the vehicle AM, a power source (rechargeable battery or the like) B is mounted on the vehicle lower side AM2. The wire harness 10 is physically and electrically connected with the power source B, and a part of the wire harness 10 is provided in an extending manner from the vehicle lower side AM2 to the ceiling AM1 along a pillar (here, what is called an A pillar) P of a vehicle body. A part of the wire harness 10 is provided to a space in the inside of the pillar P.

The in-vehicle equipment control system 1 includes a controller (hereinafter, referred to as "ceiling side controller") 20 provided to the ceiling AM1. Although the ceiling side controller 20 targets the equipments En to be controlled that are provided at least to the ceiling AM1, the other equipments En arranged on the vehicle lower side AM2 may also be included in the target to be controlled.

The ceiling side controller 20 supplies thereto electric power from the power source B via the wire harness 10 passing through the pillar P. The wire harness 10 includes a power source line 11 that is physically and electrically connected with the power source B, and supplies the electric power output from the power source B to a power supply object. The power source line 11 is provided in such a manner that a part of the power source line 11 extends from the vehicle lower side AM2 to the ceiling AM1 along the pillar P, and physically and electrically connected with the ceiling side controller 20 in the ceiling AM1. Due to such constitution, the exemplified ceiling side controller 20 supplies thereto the electric power from the power source B via the power source line 11 passing through the pillar P. The ceiling side controller 20 supplies the power to the equipments En to be controlled in the ceiling AM1. The ceiling side controller 20 can distribute electric power thereof into a plurality of outputs to supply the distributed electric power from the outputs to the respective equipments En to be controlled. The ceiling side controller 20 is capable of distributing the electric power to the plurality of equipments En to be controlled. For example, the ceiling side controller 20 generates power sources corresponding to the respective equipments En to be controlled, based on the electric power. Although the equipment En arranged on the vehicle lower side AM2 may supply thereto the electric power from the ceiling side controller 20, it is desirable to supply the electric power via a controller arranged on the vehicle lower side AM2, such as the lower side controller 30 described below.

The power source line 11 is physically and electrically connected also with the lower side controller 30 described below on the vehicle lower side AM2 thus supplying the electric power from the power source B to the lower side controller 30. For example, the power source line 11 includes a trunk line 11A connected with the power source B; a branch line 11a that is branched from the trunk line 11A, and connected with the ceiling side controller 20; and a branch line 11b that is branched from the trunk line 11A, and connected with the lower side controller 30.

In the in-vehicle equipment control system 1, for example, various kinds of detecting devices (image pickup devices, sensors (infrared sensors), switches, or the like) provided to the ceiling AM1 with the ceiling side controller 20 are modularized to a module, and the wire harness 10 is connected with the module (hereinafter, referred to as "ceiling module"). What is called an overhead module indicates one aspect of the ceiling module.

The vehicle AM includes at least one controller (hereinafter referred to as "lower side controller") 30 arranged on the vehicle lower side AM2. The lower side controller 30 arranged on the vehicle lower side AM2 may be provided as a component different from each of the constitutional features of the in-vehicle equipment control system 1, and may also be provided as one of the constitutional features of the in-vehicle equipment control system 1. The former lower side controller 30 is, for example, provided as a main ECU (Electronic Control Unit), such as an integrated ECU of the vehicle AM, and configured to have the following control functions in addition to main control functions (braking/driving force control function, traveling control function, or the like). On the other hand, the latter lower side controllers 30 is provided as a dedicated component of the in-vehicle equipment control system 1, and configured to have the following control functions.

The lower side controller 30 retains an information signal used when the ceiling side controller 20 controls the equipment En, and can transmit the information signal to the ceiling side controller 20. The information signal is a signal in regard to information required for control of the equipment En. For example, as the information signal, the following information is applicable; that is, an information acquired from sensors, switches, such as a vehicle information signal (IG on/off signal, a TAIL on/off signal, an ACC on/off signal, or the like), or an outside-of-vehicle information signal. Furthermore, when the lower side controller 30 generates a control signal of the equipment En (an on/off signal of the equipment En, a signal with respect to controlled variable information, or the like), the control signal also corresponds to the information signal in regard to the equipment En.

When the lower side controller 30 generates a control signal of the equipment En, the ceiling side controller 20 is capable of controlling the equipment En by using the information signal (control signal) transmitted from the lower side controller 30. On the other hand, the ceiling side controller 20 may control the equipment En by using the control signal generated by the ceiling side controller 20. In this case, the ceiling side controller 20 generates the control signal of the equipment En based on control signal generation information. Examples of the control signal generation information applicable include: the information signal transmitted from the lower side controller 30; when a state information signal indicating a state of the equipment En is transmitted from the equipment En, the state information signal; and when a detection signal from a sensor, a switch, or the like is directly acquired, the detection signal.

The wire harness 10 includes at least one common transmission channel 12 capable of transmitting a plurality of information signals between the vehicle lower side AM2 and the ceiling AM1 along the pillar P. The lower side controller 30 transmits the information signals to the common transmission channel 12, and transfers the information signals to the ceiling side controller 20 via the common transmission channel 12. The information signal to be transmitted to the common transmission channel 12 may be, for example, determined by the lower side controller 30 based on the result of arithmetic processing performed by the lower side controller 30, and may be determine by the lower side controller 30 based on the request from the ceiling side controller 20. The ceiling side controller 20 controls the equipment En to be controlled, by using the electric power supplied from the power source line 11 and the information signals of the lower side controller 30, the information signals being received from the common transmission channel 12. To be more specific, as the common transmission channel 12, what is called a multiplex communication line, such as a twisted-pair cable or an optical fiber cable, may be used.

As mentioned above, the ceiling side controller 20 is provided to what is called a roof module, and the in-vehicle equipment control system 1 controls equipments En, such as a map lamp E1 and an indicator E2 that are arranged on the vehicle front side of the ceiling AM1 in the overhead console, a room lamp E3 arranged on the vehicle center side of the ceiling AM1, and an overhead reading light E4 arranged on the side of the vehicle of the ceiling AM1, via the roof module (see FIG. 3).

In the exemplified ceiling side controller 20, a plurality of information signals are input to a signal input part 21 from the common transmission channel 12, and each information signal is separately extracted in a signal extraction part 22. Here, at least the IG on/off signal (IG signal), the TAIL on/off signal (TAIL signal), and the ACC on/off signal (ACC signal) are extracted, and transmitted to respective relay parts $23rn$ (n=1, 2, 3, . . . , m). The relay part $23rn$ is a semiconductor relay, for example, and has not only a switching function but also a fuse function. Here, in the relay part $23rn$ and the equipment En, each of "n" and "m" is indicated as the identical natural number. This is for the sake of convenience, and the respective total numbers of the relay parts $23rn$ and the equipments En may be identical with each other, and may be different from each other.

Furthermore, in the exemplified ceiling side controller 20, the electric power of the power source B that is supplied through the power source line 11 is distributed in a power distribution part 24, and transmitted to each relay part $23rn$ that functions as a supply power controller. For example, the relay part $23r1$ generates an IG power source based on the electric power distributed and the IG on/off signal. The relay part $23r2$ generates a TAIL power source based on the electric power distributed and the TAIL on/off signal. The relay part $23r3$ generates an ACC power source based on the electric power distributed and the ACC on/off signal. For example, the IG power source is branched into several lines in a power distributor 41, and one of the lines is connected with the map lamp E1 via a switch 51, while another line is connected with the indicator E2 via a relay 42. The TAIL power source is connected with the room lamp E3 and the overhead reading light E4.

As described heretofore, the in-vehicle equipment control system 1 according to the present embodiment arranges the common transmission channel 12 (multiplex communication line) between the ceiling AM1 side and the vehicle lower side AM2 along the space in the inside of the pillar P, and connects the ceiling side controller 20 and the lower side controller 30 through the common transmission channel 12. Due to such constitution, the in-vehicle equipment control system 1 is capable of transmitting a plurality of information signals from the vehicle lower side AM2 to the ceiling side AM1 through one common transmission channel 12 thus reducing the number of the electric lines provided to the space in the inside of the pillar P, and preventing an increase in the number of the electric lines provided to the space in the inside of the pillar P even when the types and number of the equipments En provided to the ceiling AM1 are increased. Consequently, it is possible for the in-vehicle equipment control system 1 to achieve the wire saving and diameter reduction of the wire harness 10. The in-vehicle equipment control system 1 improves the degree of freedom of design of the pillar P thus improving the strength and design nature of the pillar P, and achieving the decrease in dead angle region due to the pillar P. Even when another information signal is required for the ceiling AM1 side, the in-vehicle equipment control system 1 is capable of transmitting the information signal from the vehicle lower side AM2 to the ceiling AM1 side through the existing common transmission channel 12 only by changing a control program of the lower side controller 30. Consequently, the in-vehicle equipment control system 1 is capable of flexibly complying with the following demands at a low cost; that is, the demand for improving functions of the existing equipment En provided to the ceiling AM1, and the demand for installing an additional equipment En in the ceiling AM1.

Here, the explanation is made assuming that the in-vehicle equipment control system 1 according to the present embodiment arranges the power source line 11 and the common transmission channel 12 along one pillar P (A pillar, as described above). However, in the in-vehicle equipment control system 1, the power source line 11 and the common transmission channel 12 may be separately arranged along the respective pillars P. For example, the in-vehicle equipment control system 1 may arrange the power source line 11 along one pillar P (A pillar) arranged on the left side of a vehicle, and may arrange the common transmission channel 12 along the other pillar P (A pillar) arranged on the right side of the vehicle. Furthermore, when the power source B is provided to a vehicle rear part, the in-vehicle equipment control system 1 may arrange the power source line 11 along one pillar P (C pillar, in the case of a three box sedan type vehicle AM, for example) provided to the vehicle rear part, and may arrange the common transmission channel 12 along the other pillar P (A pillar) provided to a vehicle front part.

Here, in the in-vehicle equipment control system 1, in the case where the equipment En performs operation control depending on a command value of a controlled variable, the arithmetic processing of the command value may be performed by the ceiling side controller 20, and may be performed by the lower side controller 30. In the case of the latter, the ceiling side controller 20 is capable of receiving the command value of the controlled variable that is transmitted as an information signal from the lower side controller 30 via the common transmission channel 12, and controlling the equipment En by using the received command value.

Here, the in-vehicle equipment control system 1 may be configured such that the power source line 11 can be used as the common transmission channel 12; that is, the in-vehicle equipment control system 1 may be configured to have what is called a power-source superimposed multiplex communication function. In this case, the lower side controller 30 is configured such that an information signal can be superimposed on the power source line 11.

Furthermore, the ceiling side controller 20 is configured such that the ceiling side controller 20 extracts electric power and an information signal from the reception signal received via the power source line 11 to control the equipment En to be controlled. Even when the in-vehicle equipment control system 1 is configured in this manner, it is possible to acquire the same advantageous effect as the case of previous exemplification.

The in-vehicle equipment control system according to the embodiments arranges the common transmission channel between the ceiling side and the vehicle lower side along the pillar, and connects the ceiling side controller and the lower side controller with each other through the common transmission channel. Due to such constitution, the in-vehicle equipment control system is capable of transmitting a plurality of information signals from the vehicle lower side to the ceiling side through one common transmission channel thus reducing the number of electric lines provided to the space in the inside of the pillar, and preventing an increase in number of the electric lines provided to the space in the inside of the pillar even when the types and number of the equipments provided to the ceiling are increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle equipment control system comprising:
    a wire harness configured to be connected with a power source mounted on a lower side of a vehicle than a ceiling of the vehicle, and provided in an extending manner from the lower side to the ceiling along a pillar of a vehicle body; and
    a ceiling side controller configured to control an equipment provided at least to the ceiling, the ceiling side controller being provided to the ceiling, electric power of the power source being supplied to the ceiling side controller via the wire harness passing through the pillar, wherein
    the wire harness includes at least one common transmission channel capable of transmitting a plurality of information signals used when the ceiling side controller controls the equipment, between the lower side and the ceiling of the vehicle along the pillar,
    the ceiling side controller controls the equipment to be controlled by using the electric power supplied and the information signals retained in a lower side controller arranged on the lower side of the vehicle, the information signals being received from the common transmission channel,
    the plurality of information signals include an IG on/off signal, a TAIL on/off signal and an ACC on/off signal as a vehicle information signal,
    the ceiling side controller has a first relay part, a second relay part and a third relay part,
    the first relay part has a switching function and a fuse function, and generates an IG power source based on an electric power distributed based on the electric power supplied from the power source line and the IG on/off signal,
    the second relay part has a switching function and a fuse function, and generates a TAIL power source based on an electric power distributed based on the electric power supplied from the power source line and the TAIL on/off signal, and
    the third relay part has a switching function and a fuse function, and generates an ACC power source based on an electric power distributed based on the electric power supplied from the power source line and the ACC on/off signal.

2. An in-vehicle equipment control system comprising:
    a wire harness configured to be connected with a power source mounted on a lower side of a vehicle than a ceiling of the vehicle, and provided in an extending manner from the lower side to the ceiling along a pillar of a vehicle body;
    a ceiling side controller configured to control an equipment provided at least to the ceiling, the ceiling side controller being provided to the ceiling, electric power of the power source being supplied to the ceiling side controller via the wire harness passing through the pillar; and
    a lower side controller arranged on the lower side of the vehicle, wherein the wire harness includes at least one common transmission channel capable of transmitting a plurality of information signals used when the ceiling side controller controls the equipment, between the lower side and the ceiling of the vehicle along the pillar, the lower side controller transmits the information signals to the common transmission channel, the ceiling side controller controls the equipment to be controlled by using the electric power supplied and the information signals received from the common transmission channel, the plurality of information signals include an IG on/off signal, a TAIL on/off signal and an ACC on/off signal as a vehicle information signal, the ceiling side controller has a first relay part, a second relay part and a third relay part, the first relay part has a switching function and a fuse function, and generates an IG power source based on an electric power distributed based on the electric power supplied from the power source line and the IG on/off signal, the second relay part has a switching function and a fuse function, and generates a TAIL power source based on an electric power distributed based on the electric power supplied from the power source line and the TAIL on/off signal, and the third relay part has a switching function and a fuse function, and generates an ACC power source based on an electric power distributed based on the electric power supplied from the power source line and the ACC on/off signal.

3. The in-vehicle equipment control system according to claim 1, wherein the wire harness includes a power source line configured to supply electric power output from the power source, and a multiplex communication line as the common transmission channel, and the power source line and the multiplex communication line are provided in an extending manner from the lower side to the ceiling of the vehicle along the pillar, and connected with the ceiling side controller.

4. The in-vehicle equipment control system according to claim 2, wherein the wire harness includes a power source line configured to supply electric power output from the power source, and a multiplex communication line as the common transmission channel, and the power source line and the multiplex communication line are provided in an extending manner from the lower side to the ceiling of the vehicle along the pillar, and connected with the ceiling side controller.

5. The in-vehicle equipment control system according to claim 1, wherein a power source line is used as the common transmission channel, the power source line being connected with the ceiling side controller, the lower side controller, and the power source, the power source line being configured to supply electric power output from the power source to the ceiling side controller and the lower side controller, the lower side controller superimposes the information signals on the power source line, and the ceiling side controller extracts electric power and the information signals from a reception signal received via the power source line, and controls the equipment to be controlled.

6. The in-vehicle equipment control system according to claim 2, wherein a power source line is used as the common transmission channel, the power source line being connected with the ceiling side controller, the lower side controller, and the power source, the power source line being configured to supply electric power output from the power source to the ceiling side controller and the lower side controller, the lower side controller superimposes the information signals on the power source line, and the ceiling side controller extracts electric power and the information signals from a reception signal received via the power source line, and controls the equipment to be controlled.

7. The in-vehicle equipment control system according to claim 1, wherein the ceiling side controller is configured to control a plurality pieces of the equipment, the wire harness further includes a power source line that supplies the electric power output from the power source to the ceiling side controller, and the ceiling side controller generates a power source corresponding to the respective pieces of the equipment to be controlled, based on the electric power supplied from the power source line, and controls the equipment to be controlled by using the electric power supplied from the power source and the information signals.

8. The in-vehicle equipment control system according to claim 2, wherein the ceiling side controller is configured to control a plurality pieces of the equipment, the wire harness further includes a power source line that supplies the electric power output from the power source to the ceiling side controller, and the ceiling side controller generates a power source corresponding to the respective pieces of the equipment to be controlled, based on the electric power supplied from the power source line, and controls the equipment to be controlled by using the electric power supplied from the power source and the information signals.

9. The in-vehicle equipment control system according to claim 1, wherein the ceiling side controller is configured to control a plurality pieces of the equipment provided at the ceiling and an equipment provided at the lower side of the vehicle.

10. The in-vehicle equipment control system according to claim 2, wherein the ceiling side controller is configured to control a plurality pieces of the equipment provided at the ceiling and an equipment provided at the lower side of the vehicle.

* * * * *